Nov. 8, 1960  P. W. THOMPSON ET AL  2,958,908
METHOD FOR DETERMINING THE END PLAY OF A ROTATABLE SHAFT
Filed April 30, 1957
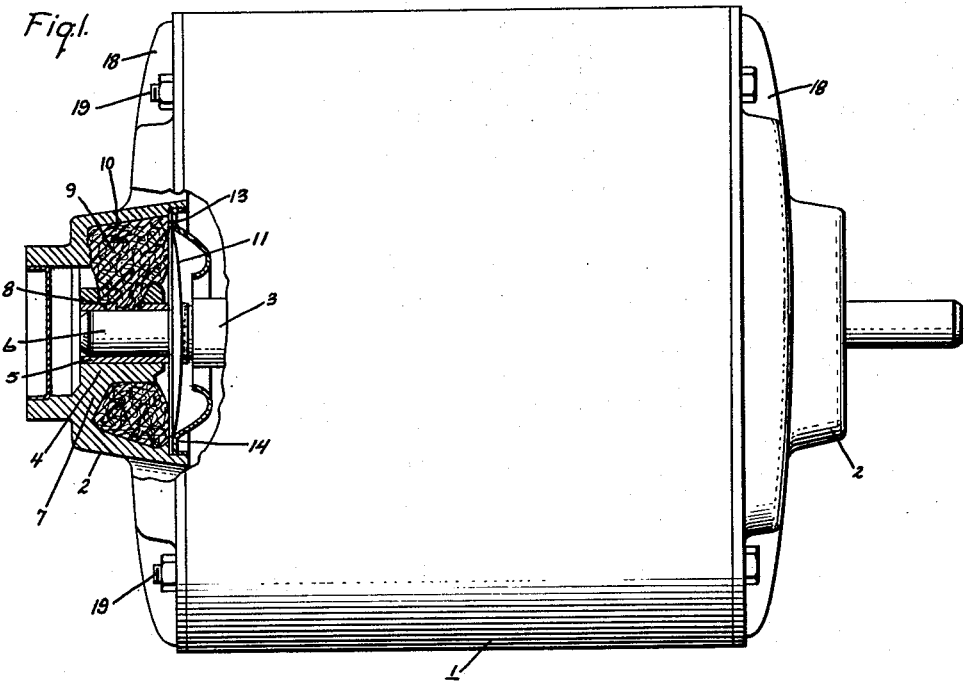
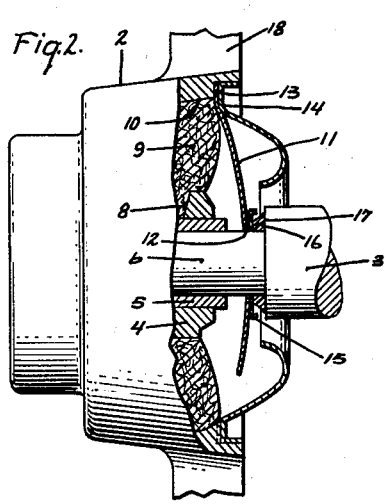
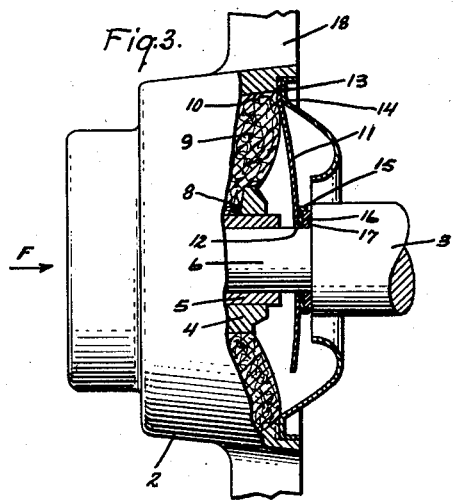
Inventors:
Paige W. Thompson,
Myron D. Tupper,
by Robert G. Irish
Their Attorney.

United States Patent Office 2,958,908
Patented Nov. 8, 1960

2,958,908

METHOD FOR DETERMINING THE END PLAY OF A ROTATABLE SHAFT

Paige W. Thompson and Myron D. Tupper, Fort Wayne, Ind., assignors to General Electric Company, a corporation of New York Filed Apr. 30, 1957, Ser. No. 656,133

2 Claims. (Cl. 18—59)

This invention relates to apparatus having rotatable parts, and more particularly to a method for determining the amount of axial freedom or "end play," of such parts.

In equipment which is driven by rotatable machines, such as, for instance, electric motors, it is frequently necessary that the axial positioning of the rotatable driving shaft be precise, with a very limited amount of axial freedom. Such axial freedom, or "end play" as it is called, may have a pronounced effect on the operation of the device being driven. For instance, where an electric motor drives a part which rotates within a seal intended to keep fluid out, leakage through the seal is pronouncedly affected by the amount of end play of the shaft.

Accordingly, it is important to maintain the end play of the rotatable driving part, such as the motor shaft, to an absolute minimum. However, it is an established fact that the smaller the manufacturing tolerances allowed, the greater is the expense involved in the manufacture. Consequently, in the past, the cost of machines has risen substantially where little end play could be tolerated.

It is therefore, an object of the invention to provide an improved method of assembly of a bearing construction so as to achieve the desired control over the end play.

In one aspect thereof the method of this invention provides, in a bearing assembly, a rotatable shaft which has a substantially radially arranged surface provided thereon. A part is mounted about the shaft and has a surface which is formed in a substantially radial plane axially spaced from the first mentioned surface. A thrust bearing member is in thrust receiving engagement with the second mentioned surface, and a mass of cured thermosetting resin fills the axial space between the surfaces.

In the assembly of the structure, the part is mounted about the shaft and the axial space between the surfaces is filled with uncured thermosetting resin to an extent sufficient to cause the part to be in engagement with the thrust receiving member. The surfaces are then compresed together with a force substantially equal to or slightly greater than that to which they are subjected during use of the machine; this may be effected very simply by, for instance, assembling the machine so that the bearing parts are in their operative positions. The resin is then cured to provide the final construction. This practically eliminates the end play since the resin fills substantially all the free axial space. A very small but positive amount of end play may be provided in order to avoid tightness during operating by any suitable expedient, such as, for instance, by having the rotor hot during the assembly so that when it cools, it will shrink and provide the desired spacing.

The features of the invention which are believed to be novel are set forth with particularity in the appended claims. The invention itself, however, together with further objects and advantages thereof may best be understood by reference to the following description taken in connection with the accompanying drawing.

In the drawing:

Figure 1 is a plan view of an electric motor, broken away at one end to reveal in cross section a bearing assembly including the improved end play determining means;

Figure 2 is an enlarged fragmentary view, partly in in cross section, of the bearing assembly while it is undergoing the improved process of the invention; and Figure 3 is an enlarged fragmentary view, partly in cross section, of the improved bearing assembly after application of the improved method.

Referring now to Figures 1 to 3 of the drawing, there is shown an electric motor, generally indicated at 1, having a pair of bearing housings 2 respectively formed at each end in end shields 18. A shaft 3 is rotatably supported in the usual manner by bearings such as 4, each having a suitable bearing surface 5 in sliding contact with portion 6 of the shaft; each bearing 4 is supported by a housing 2 through the usual medium of an inwardly extending spider 7. An opening 8 is formed in the bearing 4, and a mass of lubricant-impregnated wicking 9 fills the space 10 between the housing 2 and the bearing 4 and extends through opening 8 into contact with shaft portion 6 so as to effect proper lubrication of the bearing. Wicking 9 is retained within the cavity 10 by a member 11 which is provided with an opening 12 for shaft portion 6 and which has apices 13 provided at a plurality of points around its periphery, each apex being secured within housing 2 through the medium of a retainer member 14, as shown. Member 11 is formed of stiffly resilient material, and has its inner portion adjacent the shaft arranged in thrust bearing relationship with a washer 15 which has its surface arranged in a substantially radial plane for thrust bearing purposes. When finally assembled, washer 15 is rigidly secured about shaft portion 3 by a mass 16 of resin which has been secured to a hard unyielding consistency and which substantially fills the axial space between the surface of washer 15 and a substantially radially extending surface 17 formed by the shoulder where shaft portion 6 joins the remainder of shaft 3. In order to effect the desired results, the resin 16 is of an entirely yielding nature before final assembly when it is in its uncured state, and hardens into a rigid unyielding mas once it has been cured.

In the assembly of the bearing, it is arranged, as shown in Figure 2, with washer 15 loosely mounted about shaft portion 6 and with uncured resin 16 of paste-like consistency filling the space between the washer 15 and the shaft surface 17. While a relatively standard washer 15 has been shown, modifications on this basic theme are readily apparent, and it is understood that part of the essence of the invention lies in the provision of a thrust surface spaced from surface 17, regardless of any particular washer arrangement. At this point, a force F is exerted on the bearing housing 2 while shaft 3 is secured rigidly against movement of the right, as viewed in Figure 2. This is easily effected, for instance, merely by assembling motor 1 and tightening bolts 19 to secure end shields 18 together. Force F is dependent on the tightness of the bolts, and thus inherently represents the amount of force which will be exerted upon the housing relative to the shaft during operation of the motor. In response to the force F, end shield 18 deforms, and member 11 is forced against the washer 15 so as to compress the washer 15 and the shaft surface 17 toward each other a predetermined axial distance and compress the uncured resin (Figure 3). At this point, the resin is cured by any desired means such as, for instance, the ordinary heating process. The resin forms itself into a hard unyielding mass which secures the washer 15 about shaft portion 6 in the proper position for substantially zero end play to be obtained. If desired, the shaft 3 may be slowly rotated during the curing of the resin so that the surface of washer 15 will be in a true radial plane for thrust bearing purposes. To ensure that there will definitely be a little end play to preclude binding, the end shield 18 may be subjected to a predetermined additional force (as by impact, for instance) to cause a small predetermined additional amount of deflection. Another way to ensure a little end play is to maintain shaft 3 heated during the process. Once the shaft cools down to its normal temperature, it will shrink slightly and provide the desired small amount of end play.

Resin 16 may be any of several thermosetting resins with the selection being entirely dependent upon the optimum manufacturing arrangement found to be practical. Three such resins which are satisfactory, for instance, are epoxy type resins, polyester resins, and phenolic resins. Where the washer construction is as shown, it is preferable for the resin to have a paste-like consistency to remain in place between washer 15 and shaft surface 17 in its uncured state. This paste-like consistency may be readily provided by adding suitable fillers to liquid resins until the desired consistency is obtained. One such mixture which has proved suitable is 25% by weight epoxy resin, 25% polyamide, and 50% inert filler (such as mica, silica, or barium sulfate). Obviously, many other compositions are suitbale for the purpose, and it is not intended to limit the invention to any specific compositions.

It will be seen from the foregoing that the invention provides a construction and method of assembly where the end play of a motor may be readily controlled and held to a minimum in a simple economical manner.

While the invention has been explained by describing a particular embodiment thereof, it will be apparent that improvements and modifications may be made without departing from the scope of the invention as defined in the appended claims.

What we claim as new and desire to secure by Letters Patent of the United States is:

1. In a machine bearing assembly for a rotatable shaft having a substantially radially arranged surface, where said assembly includes a stationary thrust bearing member adapted to be in thrust receiving relation to said shaft: a method of determining the amount of end play of said shaft which comprises the steps of loosely arranging about said shaft between said thrust bearing member and said surface a part having a surface formed in a substantially radial plane axially spaced from said first mentioned surface, filling the space between said surfaces with a mass of uncured thermosetting resin, compressing said surfaces together a predetermined axial distance, curing said resin, and rotating said shaft during curing of said resin.

2. In a machine bearing assembly for a rotatable shaft having a substantially radially arranged surface, where said assembly includes a thrust bearing member adapted to be in thrust receiving relation to said shaft: a method of determining the end play of said shaft which comprises the steps of loosely arranging about said shaft between said thrust bearing member and said surface a part having a surface formed in a substantially radial plane axially spaced from said first mentioned surface, filling the space between said surfaces with a mass of uncured thermosetting resin, compressing said surfaces together with a force at least equal to that to which they are subjected during use of the machine, maintaining said shaft in a heated condition during application of said force thereby to provide a small additional amount of end play upon cooling of said shaft and curing said resin.

References Cited in the file of this patent

UNITED STATES PATENTS

| | | |
|---|---|---|
| 2,078,783 | Welch | Apr. 27, 1937 |
| 2,307,874 | Bilde | Jan. 12, 1943 |
| 2,312,579 | O'Brien | Mar. 2, 1943 |
| 2,448,483 | Bassett | Aug. 31, 1948 |
| 2,600,353 | Wightman | June 10, 1952 |
| 2,661,500 | Seymour et al. | Dec. 8, 1953 |
| 2,703,737 | Turner | Mar. 8, 1955 |